United States Patent [19]

Isenberg

[11] 4,029,004

[45] June 14, 1977

[54] MEAT CURING RACK

[76] Inventor: Edward Isenberg, 122 Jeanmoor Road, Tonawanda, N.Y. 14150

[22] Filed: Oct. 9, 1973

[21] Appl. No.: 404,403

[52] U.S. Cl. .................................. 99/477; 211/196
[51] Int. Cl.² .......................................... A23B 4/04
[58] Field of Search ................... 99/477, 447–450, 99/467, 469; 211/132, 144, 149, 178, 181

[56] References Cited

UNITED STATES PATENTS

| 1,867,523 | 7/1932 | Omurei | 99/477 |
|---|---|---|---|
| 2,021,746 | 11/1935 | Purnell | 211/178 R X |
| 2,440,513 | 4/1948 | Kaelin et al. | 211/178 R |
| 2,512,340 | 6/1950 | Krauss | 211/178 R |
| 2,698,726 | 1/1955 | Howe | 211/178 R X |
| 2,716,495 | 8/1955 | Prevette et al. | 211/181 X |
| 3,043,440 | 7/1962 | Berlin | 211/178 R |
| 3,212,426 | 10/1965 | Lewus | 99/447 X |
| 3,235,096 | 2/1966 | Hallock et al. | 211/149 |
| 3,498,211 | 3/1970 | Atkins | 99/446 X |

FOREIGN PATENTS OR APPLICATIONS 1,116,444  2/1956  France ................................ 99/467

Primary Examiner—Harvey C. Hornsby
Assistant Examiner—Arthur O. Henderson
Attorney, Agent, or Firm—Joseph P. Gastel

[57] ABSTRACT

A rack construction for use with meat which has been injected with curing solution and which is to be smoked comprising a frame, spring-like brackets on said frame for supporting shelves in either a horizontal meat supporting position or a relatively vertical washing and storage position, pan means on said frame in underlying relationship to said shelves for collecting curing and other solution which drains from meat on said shelves, and pivot means mounting said pans for movement between a horizontal solution-collecting position and a vertical pan-washing position.

11 Claims, 6 Drawing Figures

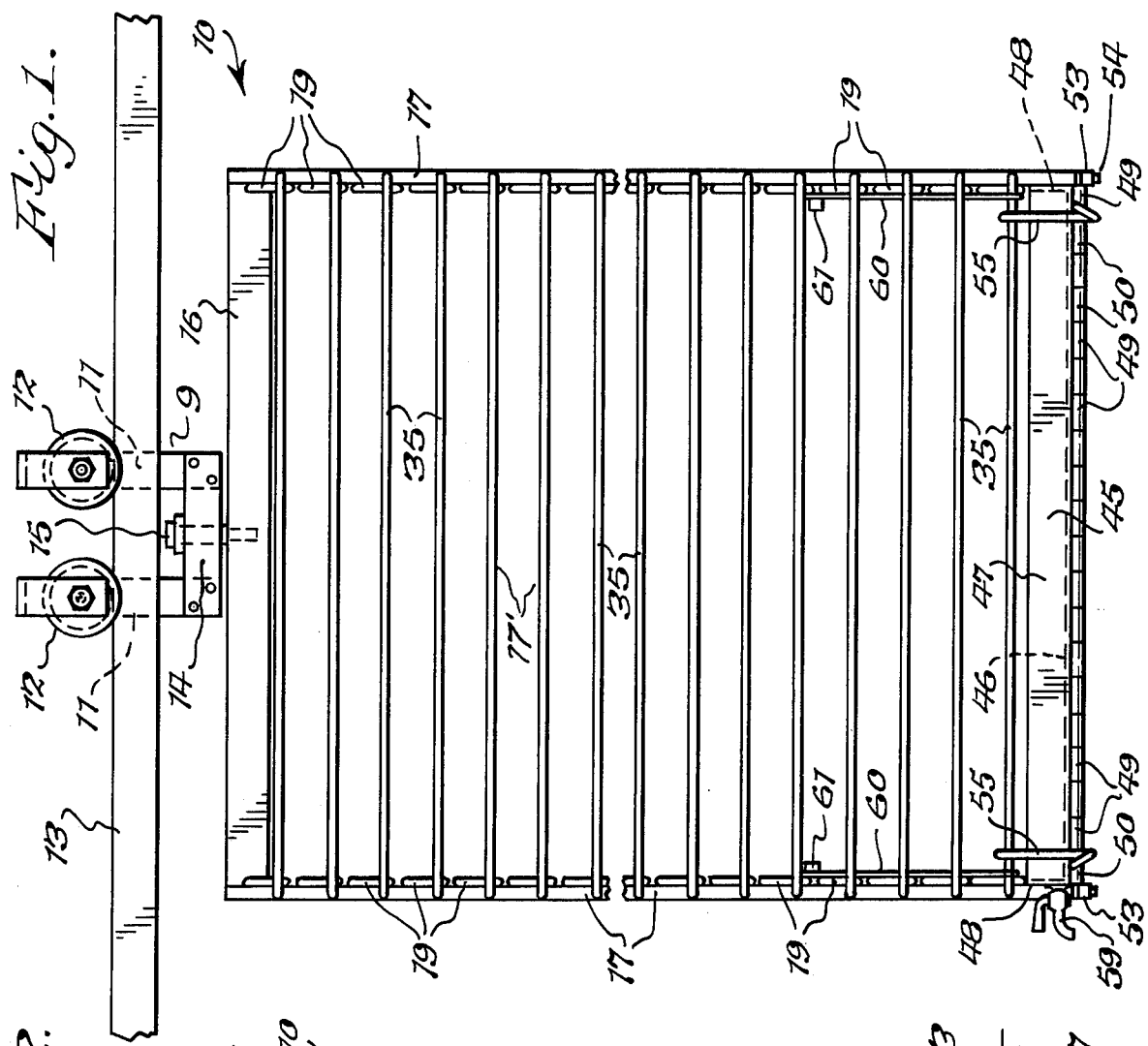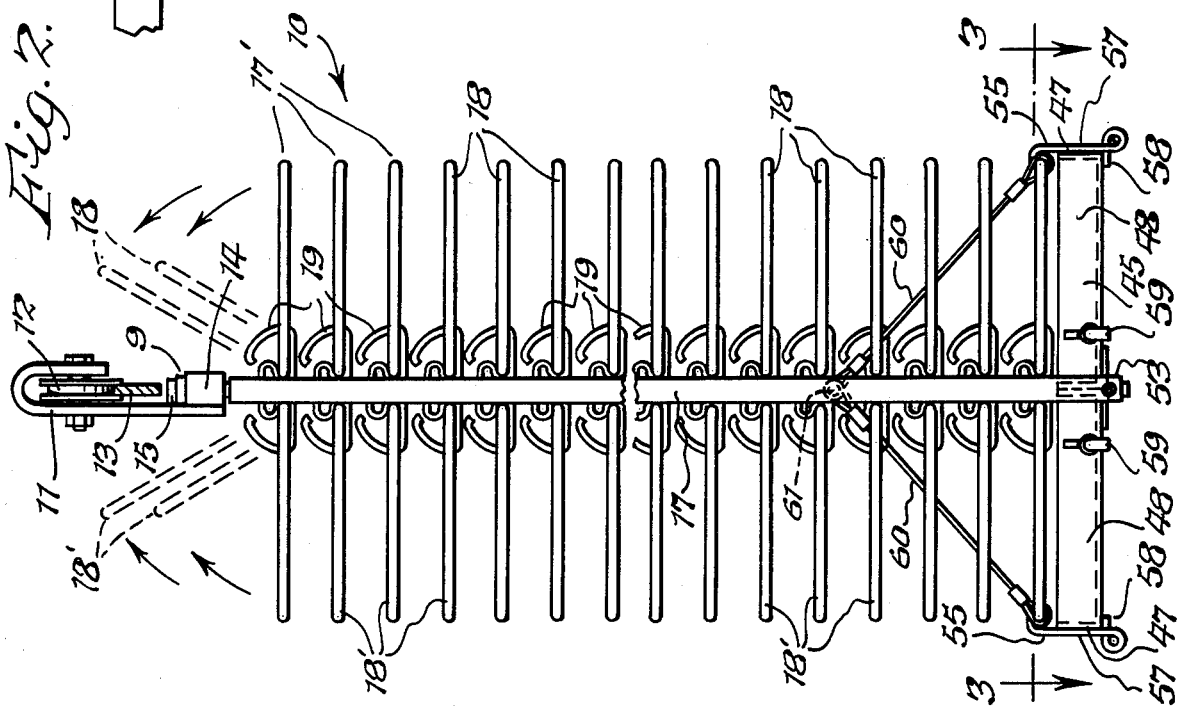

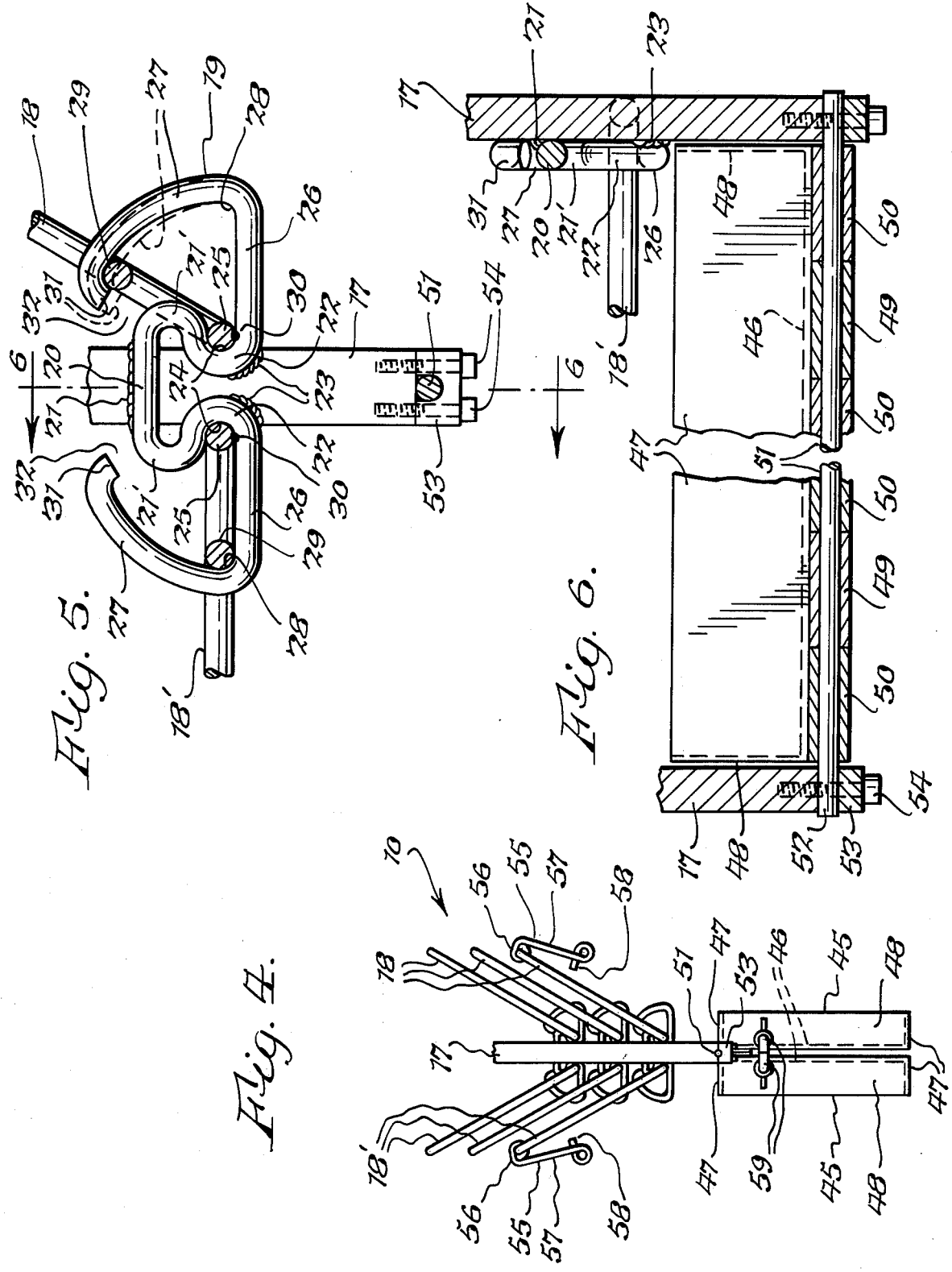

MEAT CURING RACK

The present invention relates to an improved rack for the use in the processing and smoking of meat.

By way of general background, meat such as bacon is prepared by injecting a curing solution into a hog or pork belly and thereafter placing a plurality of bellies on a rack and smoking the meat in a smoke room for a number of hours, after which the meat is cooled in the same rack and subsequently removed for further processing. The curing solution is essentially a brine which includes sugars, spices, nitrites, nitrates, phosphates, and other conventional substances which are well known in the art.

Prior procedures and apparatus used for processing of meat in accordance with the foregoing general procedure were generally wasteful and inefficient. In this respect, of the total amount of curing solution which was injected into the meat, the greater percentage drained from the meat after it was placed on the prior art type of rack and was permitted to pass into a sewer. This was wasteful for a number of reasons. First of all, this solution was relatively costly, approximately ten cents per gallon. Secondly, the curing solution creates pollution, and where pollution control was required, an additional cost burden was placed on the product being manufactured. Thirdly, in prior apparatus for curing pork bellies, the number of bellies which could be loaded on the prior art types of racks was limited because sanitary regulations required the lowest portions to be no closer than one foot from the floor. This regulation was formulated to avoid contamination from drippings which could splash back onto the meat from the floor. It is with overcoming the foregoing deficiencies of prior meat curing racks that the present invention is concerned.

It is accordingly one important object of the present invention to provide an improved meat curing rack which collects curing solution which drains from the meat so as to permit it to be reused, thereby not only preventing the waste of such solution, but also obviating the pollution which such solution could produce if it were discarded in an untreated manner, or minimizing the cost of pollution treatment if such solution were to be segregated and treated before being discarded. A related object of the present invention is to provide an improved meat curing rack which may obviate the requirement for washing up the smoke room floor after each curing cycle.

Another object of the present invention is to provide an improved bacon curing rack which permits the bacon loaded thereon to be relatively close to but separated from the floor by a solution collecting pan so as to provide greater loading on the rack than was heretofore possible, thereby in turn providing more efficient utilization of smoke room space to increase production capacity without essentially increasing costs.

A further object of the present invention is to provide an improved bacon curing rack which is constructed in such a manner so as to permit quick and easy loading and unloading of pork bellies onto the rack while also permitting the loaded pork bellies to lie relatively close to each other, thereby providing further efficient utilization of smoke room space which in turn results in increased production without essentially increasing costs. A related object of the present invention is to provide increased production efficiency by reducing the number of total weighings because each rack carries a greater number of bellies of meat than prior types of racks.

A still further object of the present invention is to provide an improved bacon curing rack which is collapsible in an unique manner for washing and storage, thereby conserving both storage space and washing room space.

Yet another object of the present invention is to provide an improved meat curing rack in which the shelves are insertable and removable from the remainder of the rack for ease of shipment or replacement or repair in an extremely simple and efficient manner.

Still another object of the present invention is to provide an improved method of curing meat which results in the reclamation and reuse of curing solution which was heretofore wasted, thereby not only producing an economy in manufacturing but also lessening pollution from discarded curing solution. Other objects and attendant advantages of the present invention will readily be perceived hereafter.

The present invention relates to an improved rack construction for use with meat which has been injected with a curing solution and which is to be smoked comprising supporting means for supporting said meat on said rack and collecting means located beneath said supporting means for collecting curing solution which drains from said meat for controlled disposal of said curing solution to an area where it can be reused and thereby not wasted, or for segregation and treatment in pollution control. In its most simple form, the collecting means comprises pan means mounted on said rack below the meat supporting means to catch the drainage therefrom. Furthermore, in accordance with another aspect of the present invention, the shelves are movable between a relatively horizontal position and a relatively vertical position to facilitate loading of the meat on the shelves in an efficient manner. In accordance with still another aspect of the present invention, the shelves and the pans of the rack are collapsible in an unique manner for efficient washing and storage.

The present invention also relates to an improved method of curing meat comprising the steps of injecting curing solution into the meat, and collecting the curing solution which drains from the injected meat so as to permit reuse of said curing solution. The various aspects of the present invention will be more fully understood when the following portions of the specification are read in conjunction with the accompanying drawings wherein:

FIG. 1 is a fragmentary side elevational view of the improved meat curing rack of the present invention;

FIG. 2 is a fragmentary end elevational view of the meat curing rack taken from the left of FIG. 1;

FIG. 4 is a fragmentary end elevational view similar to FIG. 2 but showing the shelves retained in a more vertical position and also showing the pans pivoted to a vertical position for ease of washing;

Figure 3:
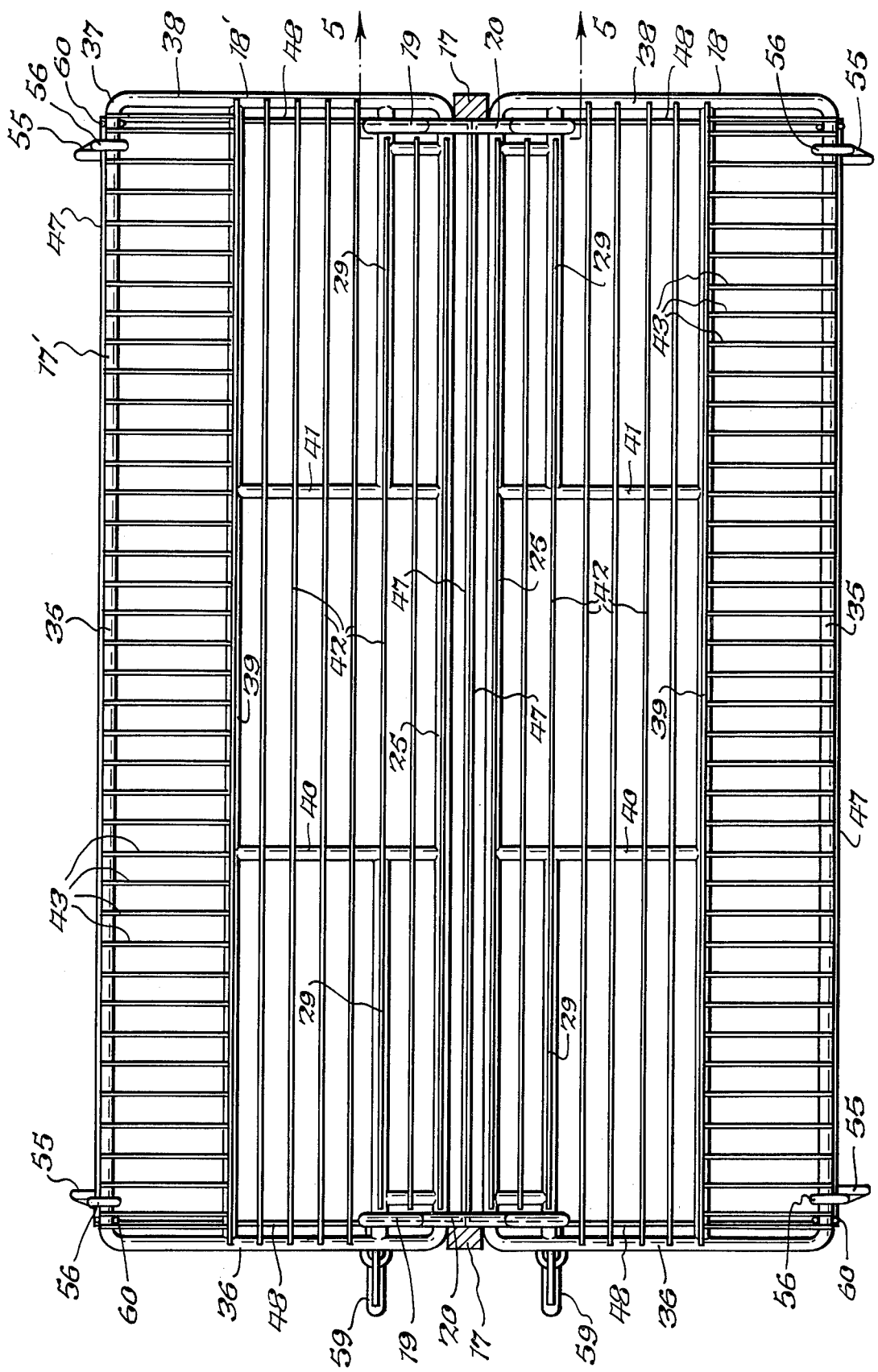
FIG. 3 is a cross sectional view taken substantially along line 3—3 of FIG. 2 and showing the details of construction of the shelves forming a part of the rack and also showing the underlying relationship of the pans for collecting curing solution.

FIG. 5 is a fragmentary cross sectional view taken substantially along line 5—5 of FIG. 3 and showing the details of construction of the spring brackets which are used to support the shelves in either a horizontal or a more vertical position, as desired; and FIG. 6 is a fragmentary cross sectional view taken substantially along line 6—6 of FIG. 5 and showing primarily the details of construction of the hinge structure which pivotally supports the solution collecting pans.

The improved meat curing rack 10 of the present invention is shown in the form of a trolley having a support bracket 9 having inverted J-shaped arms 11 journalling wheels 12 which roll on rail 13. Bar 14 which is secured to the lower ends of arms 11 pivotally mounts pin 15 which is secured to horizontal frame member 16, which in conjunction with spaced vertical frame members 17 form the frame of rack 10. Because of the pivotal mounting afforded by pin 15, the rack can assume the position shown in FIG. 1 during loading and unloading and it can be twisted to a position at right angles to that shown in FIG. 1 for purposes of compact storage and washing. As is well understood, the rack 10 in the form of a trolley will be moved along rail 13 from station to station where various meat processing functions, such as loading of the rack, smoking of the meat, cooling of the meat, and unloading of the rack are performed. It will be appreciated however that the principles of the present invention, as described in greater detail hereafter, need not be restricted for use with a trolley type of rack but may be incorporated in a wheeled type of rack which rolls on the floor or any other type of rack.

A plurality of pairs of shelf sections 18 and 18' are mounted on spring supporting brackets 19 welded to vertical frame members 17. Each complete shelf 17' on the rack consists of a shelf section 18 in horizontal alignment with a corresponding shelf section 18', as can be seen from FIG. 2. It is to be further noted at this point from FIG. 3 that shelf section 18' is identical to section 18 but is positioned on the frame in mirror-image relationship to shelf section 18.

As can best be seen from FIG. 5, each spring supporting bracket 19 includes a central portion 20 which is welded to vertical frame member 17 at 21. In addition, central portion 20 merges into curved portions 21' which merge into curved portions 22 which are also welded to frame member 17 at 23, with portions 22 defining concavities 24 for receiving rod-like sides 25 of shelf sections 18 and 18'. Curved portions 22 merge into relatively straight portions 26 which in turn merge into curved arm portions 27. A concave portion 28 is located at the junction of portions 26 and 27 for the purpose of receiving bars 29 of shelf sections 18 and 18' when said shelf sections are hortizontal. It can thus be seen that shelf sections 18 and 18' are supported in cantilevered fashion by brackets 19 because rods 25 and 29 of each shelf section are supported at concave portions 24 and 28, respectively.

As noted briefly previously, bracket 19 is fabricated from spring steel which permits it to yield under stress and causes it to return to its original configuration after the stress is removed. Furthermore, portions 27 are bent about a radius having its center at 30, whereas the rack sections 18 and 18' pivot about the center of rods 25 because of the manner in which said rods are supported in concave recesses 24. Furthermore, the distance between rods 25 and 29 remains constant. Therefore, as each rack section is pivoted from the horizontal position shown in the left of FIG. 5 to the more vertical position shown in the right of FIG. 5, bracket arm portion 27 will be stressed so that it will yield from the dotted line position 27 at the right of FIG. 5 to the solid line position shown therein so that it will exert a holding or biasing force because of its spring characteristic to retain the shelf section 18 or 18' in an upwardly inclined position, such as shown in FIG. 5 and also shown in FIGS. 2 and 4. The end portions 31, at the outer ends of bracket portions 27, are bent as shown to provide a stop thereby limiting the movement of shelf sections 18 and 18' upwardly. At this point it is to be noted that if for any reason it is desired to remove shelf sections 18 or 18' from the rack, it is merely necessary to stress bracket sections 27 outwardly against its inherent bias so that rods 29 can clear ends 31 and enter the space 32 to thereby permit rods 25 to be moved out of concave portions 24 and thereafter permit shelf sections to be manipulated so as to permit their removal from the remainder of the rack.

Broadly, each of the shelf sections 18 and 18' includes an outer rectangular framework consisting of rod-like cylindrical long sides 25 and 35 and rod-like cylindrical short sides 36 and 38. Intermediate brace members 39, in the form of cylindrical rods, extend between and are secured to sides 36 and 38. Additional intermediate brace members 40 and 41 in the form of cylindrical rods extend between and are secured to members 25 and 39, as shown in FIG. 3. Rod members 29 extend between and are secured to members 36 and 40 at first ends of shelf sections 18 and 18', and rod members 29 also extend between and are secured to members 38 and 41 at the opposite ends of shelf sections 18 and 18', as shown in FIG. 3. A plurality of wire-like rods 42 are laid across rods, 36, 38, 40 and 41, as shown, and suitably secured thereto. A plurality of wire-like rods 43 are laid across rods 35 and 39 and the opposite ends thereof are suitably attached thereto. It can thus be seen that wire-like rods 42 and 43 define the upper surfaces of shelf sections 18 and 18'. The attachment between the various parts of the shelves is preferably by welding.

Pans 45 are mounted at the lowermost portion of rack 10 for the purpose of collecting and retaining curing solution which drains from the meat on the shelves. Pans 45 are of generally rectangular solid configuration and each includes a bottom 46, opposed side walls 47 and opposed end walls 48. Hinge loops 49 are welded to one of pans 45 and hinge loops 50 are welded to the other pan 45 so that loops 49 and 50 alternate with each other, as shown in FIGS. 1 and 6, when the loops are mounted on hinge pin 51 which extends between vertical frame members 17. The opposite ends 52 of pin 51 are mounted on frame members 17 by means of brackets 53 which are secured to frame members 17 by screws 54. As can be seen from FIGS. 2, 4 and 6, the hinges for pans 45 are located essentially at the junctions of pan bottoms 46 and inner sides 47 so that the pans can assume a horizontal position such as shown in FIG. 2 or a vertical position such as shown in FIG. 4.

In order to retain pans 45 in the horizontal position shown in FIG. 2, clips 55 are provided. These clips are essentially formed of bent wire-like rods and each includes an upper loop portion 56 which is pivotally mounted on shelf sides 35 (FIGS. 3 and 4), with the clips 55 being positioned at the outer ends of shelf sides 35 (FIG. 3). Clips 55 also include a central portion 57 which merges into a latch portion 53 which snaps under the bottom of pans 45 to retain the pans in the horizontal position shown in FIG. 2. If it is desired to permit the pans 45 to drop to the position of FIG. 4, the clips 55 need merely be moved outwardly to terminate engagement between latch portions 58 and the bottoms of the pans, whereby the pans will pivot about the hinge to assume the position of FIG. 4. Spigots 59 are mounted on pans 45 to permit the withdrawal of curing solution therefrom, as required. The spigots may be actuated manually or automatically by suitable equipment, not shown, as desired. A pair of cables 60 have their upper ends looped about each pin 61 mounted on each frame end 17 and their lower ends looped about shelf sides 35. It can thus be seen that cables 60 provide support for pans 45, but because of their flexibility permit shelf sections 18 and 18' to move from the horizontal position shown in FIG. 2 to the relatively vertical position shown in FIG. 4.

In actual operation, the meat curing rack 10 must be washed after each use, and as noted briefly above, the pans 45 are placed in the vertical position shown in FIG. 4 for washing, and the shelf sections 18 and 18' are also placed in the position shown in FIG. 4 so that racks may be pivoted sideways on the rail 90° from the position shown in FIG. 1 so as not to occupy too great a space in a washroom where automatic spraying equipment is used to wash the racks. After they come out of the washroom, they are loaded with pork bellies or other meat preparatory to smoking. In this respect, the lowermost shelf sections 18 and 18' are moved from the relatively vertical position shown in FIG. 4 to the horizontal position shown in FIG. 2, and pans 45 are pivoted from the vertical position shown in FIG. 4 to the horizontal position shown in FIG. 2 and latched in position by the use of clips 55. At this time therefore the pans 45 will be horizontal and the lowermost shelf sections 18–18' will be horizontal. A plurality of pork bellies containing injected curing solution are then laid on the lowermost shelf 17' so that each pork belly extends with its longitudinal dimension lying crosswise of shelf sections 18 and 18' with each shelf section roughly supporting half of the pork belly. The shelves are dimensioned so that each shelf 18–18' will support three pork bellies. However, it will be appreciated that the shelf dimensions and the layout thereon can be varied for most efficient accommodation of other products. Any curing solution which drains from the pork bellies or other products will be caught by pans 45.

At this time it is to be noted that the pork bellies are injected with curing solution consisting of brine, sugars, spices, nitrites, nitrates and phosphates, all of which are sources of pollution. In the past generally the excess curing solution was permitted to run onto the floor and into a sewer and thus was a source of pollution. In addition, the curing solution was wasted because it could not be reclaimed. It has been estimated that for a bacon processing plant operating at normal production, the wasted curing solution could be as high as one and one-half gallons per hundred pounds of bacon. At the estimated cost of ten cents per gallon for a typical curing solution, this loss can represent $1.50 per 1,000 pounds. Furthermore, where pollution control is exercised, additional costs must be incured for disposal of wasted curing solution. However, the apparatus of the present invention permits either reclamation of the curing solution which drains from the pork bellies on the rack so that it can be reused, thereby producing a raw material saving, or the saving due to lessening the cost of treating curing solution by segregating it from other wastes.

At this point it is also to be noted that the use of sanitary pans, such as 45, permits the lowermost shelves 18–18' to be placed relatively close to but shielded from the floor. In the past, in accordance with government regulations, the lowest portions of the bellies could not be closer than one foot from the floor, to prevent contamination from the curing solution and other drippings splashing back from the floor. However, in view of the fact that pans 45 are clean and sanitary, any splashback from such pans onto the pork bellies on the lowermost shelf 17' would be harmless because such splashback would be of solution which itself was clean. Therefore, in view of the fact that the pork bellies can be placed relatively close to the floor, there can be increased production per rack because space which was formerly wasted can now be utilized. In other words, the smoke room is filled up with a greater amount of pork bellies than was heretofore possible. In addition, the sanitary regulation for washing down the smoke room floor after each smoking cycle may be eliminated.

It is to be noted that when the shelf sections 18–18' are in the horizontal position, the vertical distance between adjacent shelves is on the order of approximately 3 inches. It would be extremely difficult to insert pork bellies which are up to 2 ½ inches in thickness between adjacent shelves if they were always in the horizontal position. However, as noted above, the shelves are movable between horizontal and relatively vertical positions. Thus, pork bellies can be placed on a lower shelf while all the shelves above it are tilted upwardly. Thus, after the pork bellies are placed on the lowermost shelf 18–18' without any difficulty because there is sufficient clearance, the next shelf is lowered to a horizontal position and is loaded while the shelf above it is inclined upwardly and thereafter the next shelf is placed horizontally and loaded and so on, until all of the shelves are horizontal and are loaded. The curing solution draining from the bellies will pass downwardly through the racks and will be collected by pans 45.

After the rack 10 is fully loaded, it is moved into the smoke room where the meat is treated in the conventional manner and thereafter it is moved into the cooler wherein the meat is chilled. It is to be noted that the rack and its contents must be weighed prior to entering the smoke room, on leaving the smoke room, and on leaving the cooler. Since the rack of the present invention can carry more meat than prior racks, for reasons noted above, less weighings are required for the same total amount of meat. In fact, on an average, because of the combination of horizontal placement of the shelves, the ability to provide shelves which are closer to the floor, and to provide shelves which are higher than can be obtained with existing equipment which hangs the pork bellies vertically by means of comb-like hooks, it has been estimated that approximately 50% more pork bellies can be processed in the existing facilities such as smoke rooms and coolers.

After the bellies have been processed to the extent necessary, they are removed from rack 10. This procedure includes unloading the topmost shelf first and then swinging shelf sections 18–18' to a relatively vertical position. Thereafter the next lower shelf is unloaded and it too is swung to a relatively vertical position. The swinging of the higher shelves to the vertical position before the lower shelves are unloaded, provides the desirable clearance which enhances the ease of unloading. The foregoing procedure is followed until all of the shelves are unloaded at which time they will all occupy the position shown in FIG. 4, and then pans 45 will be swung to the positions also shown in FIG. 4, so that rack 10 may be moved into the washroom for the required washing before it is again loaded as described above.

At this point it is to be noted that the curing solution may be drained from pans 45 at any desired portion of the meat processing cycle, for example, they may be emptied before the rack is placed in the smoke room, or immediately after it is removed from the smoke room, or both.

While the foregoing description has been directed to the manufacture of bacon, it will be appreciated that the rack of the present invention can be used with other types of products and meats which are handled or processed in an analogous manner.

For bacon processing the rack 10 includes 25 shelves 17' which can each carry three bellies for a total of 75 bellies weighing approximately a total of 1,125 pounds. The overall height of the rack from the uppermost shelf to the bottom of pans 45 is approximately 90 inches. The rack is approximately 40 inches long and 27 inches wide when the shelves are horizontal. When the shelves are in the position of FIG. 4, the rack is approximately 13 inches wide. All parts of the rack are preferably fabricated from stainless steel, or equivalent material which can be used for food processing.

It can thus be seen that the improved curing rack of the present invention is manifestly capable of achieving the above enumerated objects and while preferred embodiments of the present invention have been disclosed, it will be understood that it is not limited thereto but may be otherwise embodied within the scope of the following claims.

What is claimed is:

1. A meat smoking rack comprising a frame including a pair of spaced frame members, a plurality of pairs of shelf sections oriented vertically relative to each other, and bracket means for supporting each pair of said shelf sections on said frame members so that each of said pairs of shelf sections can be oriented to lie in substantially the same plane to form a substantially horizontal shelf or can be inclined to a more vertical position to cause the rack to have less width than when said shelf sections are oriented substantially horizontally.

2. A rack is set forth in claim 1 wherein said pairs of shelf sections are so positioned relative to each other so as to permit higher shelf sections to be in said more vertical position while lower shelf sections are in said horizontal position.

3. A rack as set forth in claim 2 wherein each of said shelf sections includes first and second spaced support members and wherein each of said bracket means include a central portion, means securing said central portion to a frame member, first supporting portions on opposite sides of said central portion for supporting said first support members, and second supporting portions on said bracket means for supporting said second supporting members when said shelf sections are in said horizontal position.

4. A rack as set forth in claim 3 including third support portions on said bracket means for supporting said second supporting members when said shelf sections are in said more vertical position.

5. A rack as set forth in claim 4 wherein said third support portions comprise outer arm portions fabricated of material which has a spring characteristic.

6. A rack for use with meat which has been injected with curing solution and which is to be smoked comprising a frame, supporting means on said frame for supporting said meat, collecting pan means on said frame locate beneath said supporting means for collecting curing solution which drains from said meat to thereby permit controlled disposal or reuse of said curing solution, said rack being of the trolley type of passage through a smokehouse, and wherein said collecting pan means are positioned directly adjacent the floor of said smokehouse to permit meat on said rack to be located relatively close to the floor of said smokehouse.

7. A meat smoking rack comprising a central frame including a pair of spaced vertical frame members, a plurality of first shelf sections, first mounting means for mounting said first shelf sections in vertically spaced relationship on said frame members and extending outwardly from one side of said central frame, a plurality of second shelf sections, second mounting means for mounting said second shelf sections in vertically spaced relationship on said frame members and extending outwardly from the opposite side of said central frame from said first shelf sections, said first and second mounting means including means for mounting said first and second shelf sections in a relatively horizontal position for supporting meat thereon and in a relatively vertical position to cause said rack to have less width than when said shelves are in said relatively horizontal position, pan means, and pan mounting means for mounting said pan means in a relatively horizontal position on said frame and below said first and second shelf sections to cause said pan means to receive and store liquid which drains from meat on said shelf sections, said pan mounting means including means for permitting said pan means to be swung to a relatively vertical position from which liquid may drain therefrom.

8. A rack for use with meat which has been injected with curing solution and which is to be smoked comprising a frame, supporting means on said frame for supporting said meat, collecting pan means on said frame located beneath said supporting means for collecting curing solution which drains from said meat to thereby permit controlled disposal or reuse of said curing solution, mounting means mounting said pan means on said frame for movement between a solution-collecting position and a draining position which permits draining of washing solution therefrom, said rack including a frame, and said supporting means comprising horizontal shelves, and means for mounting said shelves on said frame for movement between a substantially horizontal position and a more vertical position.

9. A rack as set forth in claim 8 including retaining means on said frame for retaining said shelves in said horizontal position and said more vertical position.

10. A rack as set forth in claim 9 wherein said retaining means comprises spring clips mounted on said frame.

11. A rack for use with meat which has been injected with curing solution and which is to be smoked comprising a frame, supporting means on said frame for supporting said meat, collecting pan means on said frame located beneath said supporting means for collecting curing solution which drains from said meat to thereby permit controlled disposal or reuse of said curing solution, mounting means mounting said pan means on said frame for movement between a solution-collecting position and a draining position which permits draining of washing solution therefrom, said mounting means comprising hinge means securing said pans to said frame, and means for removing said curing solution from said pan means.

* * * * *